Patented Apr. 20, 1937

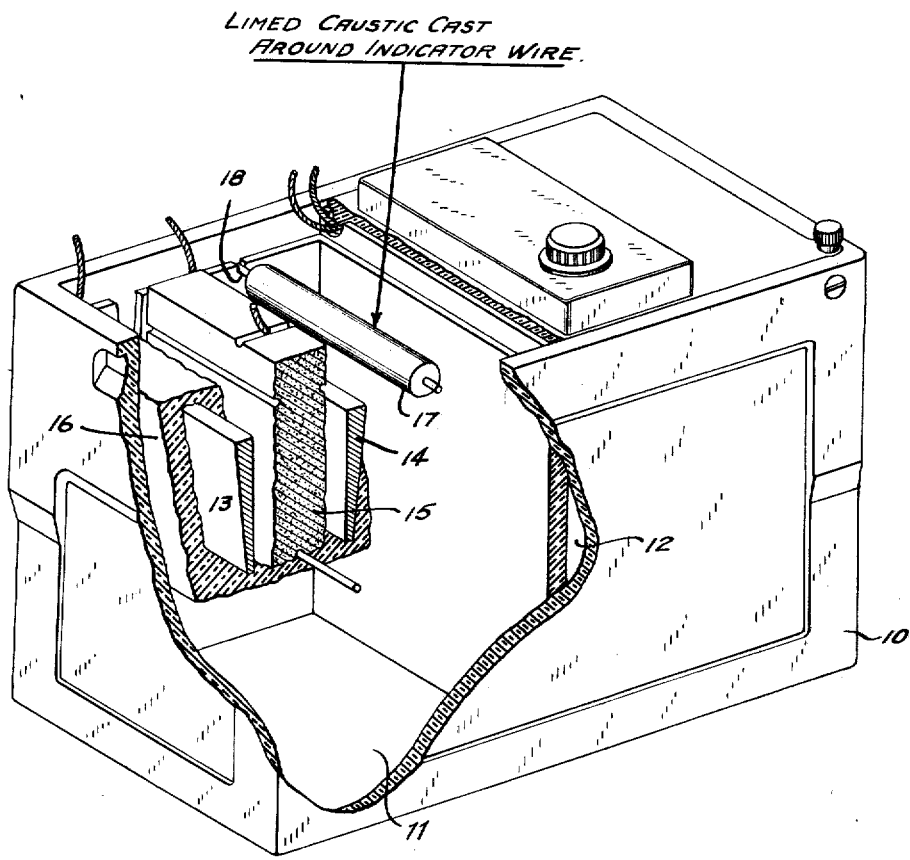

2,077,562

UNITED STATES PATENT OFFICE 2,077,562

BATTERY CELL

George W. Heise, North Olmsted, and Erwin A. Schumacher, Lakewood, Ohio, assignors, by mesne assignments, to Union Carbide and Carbon Corporation, a corporation of New York Application June 30, 1933, Serial No. 678,326

19 Claims. (Cl. 136—90)

The invention pertains in general to battery cells and more specifically to water-activated air-depolarized deferred action cells, such as those disclosed in Patent No. 1,972,775, patent application Serial No. 663,697 of G. W. Heise and also in the patent applications Serial Nos. 508,788 (now Patent No. 2,051,987, granted August 25, 1936) and 648,334 (now Patent No. 2,061,899, granted November 24, 1936) of Dario Domizi. In cells of this type one electrode may be of zinc and the other of carbon pervious to gases, the carbon electrode having a portion thereof exposed to the atmosphere outside of the battery casing so that air may enter the cell through the carbon electrode and serve as a depolarizer. Although the carbon electrode may be substantially impervious to the electrolyte employed therewith, it may be pervious to the water that is added to activate the cell, and the penetration of water into the electrode may reduce the active area to such an extent that the operation of the cell is impaired. The invention includes the features of employing part of the solid electrolyte forming material to isolate or protect the carbon electrode from the water which is added to activate the cell and from the electrolyte during the period of formation until a substantial part of the electrolyte forming material has been dissolved, and in employing part of the solid electrolyte forming material having a solution retardant incorporated therewith to materially increase the concentration of the upper portion of the electrolyte during the period of formation.

In cells, such as those disclosed in application Serial No. 663,697 the solid electrolyte material is in the form of a cast surrounding the electrodes. The solution uniformity, immediately after activation depends in large measure on the height of the casting in the container. However, for structural or other reasons it may be desirable or necessary to locate the casting so low that considerable volumes of water are permitted to remain above and not in intimate contact with the electrolyte ingredient. The result may be a non-uniform electrolyte solution, very much diluted toward the top, which may penetrate the carbon electrode to a detrimental extent and also, as is well understood in battery practice, cause accelerated and uneven corrosion of the zinc anode through the formation of "concentration cells".

As disclosed in application Serial No. 663,697 cells of this type are provided with an auxiliary body of solid electrolyte material cast around the liquid level indicator wire located at the normal solution level of the electrolyte for the purpose of increasing concentration of the electrolyte in the upper layers. Although this expedient offers a material improvement, the auxiliary casting, because of its size and position, dissolves so much more rapidly than the main body that it fails to achieve the maximum effect. Therefore, one of the chief objects of this invention is still further to increase the concentration of the electrolyte in the upper layers and thereby provide an electrolyte having a more uniform concentration.

The caustic for the auxiliary body is, of course, removed from the main casting, thus reducing the time required for complete dissolution of the latter. As a result, the time required to clear the electrodes of solid caustic and to have the battery ready for active service is reduced, and the removal of caustic from the main casting causes no significant reduction in the protection afforded the assembly during shipment and activation. Therefore, another object is to reduce the time required to activate the battery.

In cells of this type, lime, usually in the form of the hydrate, $Ca(OH)_2$, is used in conjunction with the electrolyte. The solid electrolyte material is preferably hydrated caustic soda, and the lime is introduced separately. We have found, however, that by incorporating part of the lime with the auxiliary body of solid electrolyte material, the rate of solution may be very materially decreased. By placing near the liquid surface an auxiliary body of solid electrolyte material of less rapid solution rate than the main body located somewhat lower, the dissolution of the latter permits a substantial electrolyte concentration to be reached in all but the upper solution layers, before the former has disappeared. In consequence, the auxiliary casting, instead of being dissipated throughout the electrolyte with correspondingly slight effect, serves primarily to increase the concentration in the upper layers and the result is a substantial increase in the uniformity of the solution in the battery cell. The rate of solution of the auxiliary body may be decreased by the addition of other materials such, for example, as bentonite, talc, and starch.

In size, the auxiliary body of electrolyte material should be smaller than the main body and may preferably vary from 5 per cent to 40 per cent of the active material employed, these figures being given purely for illustration. Excellent results have been attained by the use of an auxiliary body weighing about one-fifth the total caustic in the battery.

The amount of lime incorporated with the auxiliary caustic may vary considerably. About 2 per cent is required to reduce the solution rate. About 15 per cent of the total weight of the casting represents a reasonable upper limit, beyond which the mixture becomes difficult to handle in the factory, and disintegration in the battery is unduly retarded. About 10 per cent gives satisfactory results and is preferable in commercial practice, although as little as 3 per cent has been used successfully.

The comparative figures in the following table are given as an example of the improvement in uniformity of electrolyte concentration attained in practice with limed auxiliary caustic. Changes in operating conditions, variation in composition of hydrated caustic, method of addition of lime, etc., would, however, lead to different figures without altering the significance of the results, which were obtained with production batteries of identical construction except as indicated.

Solution uniformity in battery cells as grams of caustic per liter:

|  | Distance from solution level | | Average for battery | Time of solution for auxiliary caustic |
|---|---|---|---|---|
|  | ½ inch | 1 inch | | |
| No auxiliary caustic | 55 | 110 | 235 | |
| Hydrated caustic on indicator wire | 120 | 170 | 275 | 30 minutes. |
| Limed caustic on indicator wire | 230 | 240 | 275 | 5 hours. |

These results were obtained by adding auxiliary castings to batteries of regular production, hence the "average for battery" is somewhat above regular practice. For production batteries in which the main body of caustic was reduced by the amount of caustic used in the auxiliary casting we have obtained concentrations of 205 grams NaOH per liter at ½ inch depth
210 grams NaOH per liter at 1 inch depth
235 grams NaOH per liter as average for battery.

The preferred embodiment of the invention as shown by the drawing comprises a battery casing 10 having two cell compartments 11 and 12, each compartment containing two zinc electrodes 13 and 14 and a carbon electrode 15. The main body 16 of solid electrolyte material is in the form of a cast surrounding the electrodes 13, 14 and 15 and the auxiliary body 17 of the solid electrolyte material is in the form of a cast surrounding the liquid level indicator wire 18 supported by the casing 10 above the main body 16 substantially at the normal solution level of the cell.

Although the auxiliary caustic is shown in the form of a cylinder cast around the level indicating wire it may be of other form and supported by other means as disclosed in the applications referred to. Also, various changes may be made in the form, shape, relative arrangement, and means for supporting the various elements without departing from the range of the invention or the scope of the claims.

We claim:—

1. In an air-depolarized deferred action cell having carbon and zinc electrodes; a main cast of hydrated caustic soda around said electrodes below the normal solution level of said cell; and a separate auxiliary cast of said caustic soda above said main cast comprising from 2 per cent to 15 per cent lime.

2. In a water-activated air-depolarized deferred action cell; a main body of solid electrolyte ingredient in said cell that forms an aqueous solution having a relatively low concentration in the upper portion; a separate auxiliary body of solid electrolyte ingredient above said main body for increasing the concentration in the upper portion of said solution; and means for reducing the rate of solubility of said auxiliary body comprising a small proportion of lime incorporated therewith.

3. In a water-activated air-depolarized deferred action cell; a main body of alkali electrolyte ingredient in said cell that forms an aqueous solution having an initial relatively low concentration in the upper portion; means for increasing the initial concentration of said solution in the upper portion comprising a separate auxiliary body of solid electrolyte ingredient above the main body comprising from 5 per cent to 40 per cent of the total ingredient in said cell; and means for reducing the rate of solubility of said auxiliary body comprising from 2 per cent to 15 per cent of lime incorporated therewith.

4. In a water-activated deferred action cell having a water-permeable carbon electrode; a main cast of hydrated caustic soda around said electrode; an auxiliary cast of hydrated caustic soda about one-fifth the weight of the total mounted in said cell above said main cast and comprising from 2 per cent to 15 per cent by weight of lime.

5. In a water-activated air-depolarized deferred action cell, the combination of a rapidly soluble portion of electrolyte ingredient that forms an aqueous solution of relatively low concentration in the upper layers, with a slowly soluble portion of said ingredient for increasing the concentration in the upper layers of said solution.

6. In a water-activated air-depolarized deferred action cell, the combination of a rapidly soluble solid body of electrolyte ingredient comprising the main body of soluble material which forms an aqueous solution having an initial relatively low concentration in the upper layers, with a slowly soluble solid body of electrolyte ingredient for increasing the initial concentration of the upper layers of said solution.

7. In a water-activated air-depolarized deferred action cell, the combination of a rapidly soluble solid body of electrolyte-forming ingredient, the aqueous solutions of which have a specific gravity greater than that of water, with a slowly soluble body of said ingredient mounted at least partly above said rapidly soluble body.

8. In a water-activated air-depolarized deferred action cell, the combination of a rapidly soluble body of electrolyte ingredient, the aqueous solutions of which have a specific gravity greater than that of water, with a slowly soluble solid body of said ingredient located in the upper portion of said cell and comprising from 2 per cent to 15 per cent of lime.

9. In a water-activated air-depolarized deferred action cell, the combination of a rapidly soluble solid body of electrolyte ingredient that forms an aqueous solution having a specific gravity greater than that of water; with a slowly soluble solid body of said ingredient forming about one-fifth the total, mounted at least partly above the rapidly soluble ingredient, and comprising from 2 per cent to 15 per cent by weight of lime.

10. In a water-activated air-depolarized deferred action cell; a main body of solid electrolyte ingredient within the solution space of said cell that forms an aqueous solution having a specific gravity increasing with the depth, and an auxiliary solid body of said electrolyte ingredient in said cell near the solution level comprising substantially 10 per cent by weight of lime to decrease the solution rate thereof.

11. A water-activated deferred action cell comprising a carbon electrode in the upper portion of the solution space that is pervious to water but impervious to electrolyte; a main cast of electrolyte-forming material around said carbon electrode that forms an aqueous solution having a relatively low concentration in the upper portion; and a separate auxiliary cast comprising said electrolyte-forming material and lime located in the upper portion of the solution space of said cell.

12. A water-activated deferred action cell comprising a carbon electrode pervious to water but not to electrolyte; a main cast of electrolyte-forming material around said carbon electrode that forms an aqueous solution having a specific gravity greater than that of water; and a separate auxiliary cast in the upper portion of the electrolyte space in said cell comprising said electrolyte-forming material and one or more materials from the group consisting of lime, bentonite, talc, and starch.

13. A water-activated deferred action cell comprising a carbon electrode pervious to water but not to electrolyte; a main cast of electrolyte-forming material around said carbon electrode that forms an aqueous solution having a relatively low initial concentration in the upper portion that may penetrate said carbon electrode; and a separate auxiliary cast comprising said electrolyte-forming material and a solution retardant located in the upper portion of the electrolyte space for increasing the initial concentration of the upper portion of said solution.

14. A water-activated deferred action cell comprising a carbon electrode, pervious to water but not to electrolyte, located in the upper portion of the solution space; a main cast of electrolyte-forming material around said carbon electrode that forms an aqueous solution having a relatively low concentration adjacent said electrode that may be absorbed thereby; and an auxiliary cast comprising said electrolyte-forming material and talc located adjacent the upper portion of said electrode for increasing the initial concentration of said aqueous solution adjacent said electrode; the solution rate of said auxiliary body differing from the solution rate of the main body.

15. A water-activated deferred action cell comprising a carbon electrode pervious to water but not to electrolyte; a main cast of hydrated caustic soda around said carbon electrode; and an auxiliary cast above said main cast comprising caustic soda and lime.

16. A water-activated deferred action cell comprising a carbon electrode pervious to water but not to electrolyte of normal concentration; a main cast of hydrated caustic soda around said carbon electrode that forms an aqueous solution adjacent the upper portion of said electrode that may be absorbed thereby; and an auxiliary cast comprising caustic soda and from 2 per cent to 15 per cent lime located adjacent the solution level for increasing the initial concentration of the solution adjacent said electrode to such an extent that the solution will not penetrate the electrode.

17. In a water-activated air-depolarized deferred action cell having a carbon electrode pervious to water but impervious to the electrolyte employed therewith, and an electrolyte-forming material within the cell; the combination of means for isolating said electrode from the water of activation until a substantial part of said electrolyte-forming material has been dissolved, comprising a cast of part of said electrolyte-forming material that forms an aqueous solution having a specific gravity greater than that of water around said electrode; and means for increasing the concentration of the partially formed electrolyte in the upper layers during the period of formation, comprising a cast of part of said electrolyte-forming material and a solution retardant in the upper portion of said cell.

18. A water-activated deferred action cell having a main body consisting of hydrated caustic soda within said cell and an auxiliary body of hydrated caustic soda and lime disposed within said cell and above said main body.

19. In a water-activated air-depolarized deferred action cell, the combination of a main body of electrolyte ingredient that forms an aqueous solution of different concentration at different depths, with an auxiliary body of solid electrolyte ingredient located in the area of low concentration for increasing the relative concentration thereof; the solution rate of said auxiliary body being less than the solution rate of the main body.

GEORGE W. HEISE.
ERWIN A. SCHUMACHER.

CERTIFICATE OF CORRECTION.

Patent No. 2,077,562.            April 20, 1937.

GEORGE W. HEISE, ET AL.

It is hereby certified that in Certificate of Correction issued June 1, 1937 in the above numbered patent, line 5, "lines 2-3" should read lines 1-2; so that the said Certificate may conform to the record of the case in the Patent Office.

Signed and sealed this 6th day of July, A. D. 1937.

Henry Van Arsdale (Seal)            Acting Commissioner of Patents.

10. In a water-activated air-depolarized deferred action cell; a main body of solid electrolyte ingredient within the solution space of said cell that forms an aqueous solution having a specific gravity increasing with the depth, and an auxiliary solid body of said electrolyte ingredient in said cell near the solution level comprising substantially 10 per cent by weight of lime to decrease the solution rate thereof.

11. A water-activated deferred action cell comprising a carbon electrode in the upper portion of the solution space that is pervious to water but impervious to electrolyte; a main cast of electrolyte-forming material around said carbon electrode that forms an aqueous solution having a relatively low concentration in the upper portion; and a separate auxiliary cast comprising said electrolyte-forming material and lime located in the upper portion of the solution space of said cell.

12. A water-activated deferred action cell comprising a carbon electrode pervious to water but not to electrolyte; a main cast of electrolyte-forming material around said carbon electrode that forms an aqueous solution having a specific gravity greater than that of water; and a separate auxiliary cast in the upper portion of the electrolyte space in said cell comprising said electrolyte-forming material and one or more materials from the group consisting of lime, bentonite, talc, and starch.

13. A water-activated deferred action cell comprising a carbon electrode pervious to water but not to electrolyte; a main cast of electrolyte-forming material around said carbon electrode that forms an aqueous solution having a relatively low initial concentration in the upper portion that may penetrate said carbon electrode; and a separate auxiliary cast comprising said electrolyte-forming material and a solution retardant located in the upper portion of the electrolyte space for increasing the initial concentration of the upper portion of said solution.

14. A water-activated deferred action cell comprising a carbon electrode, pervious to water but not to electrolyte, located in the upper portion of the solution space; a main cast of electrolyte-forming material around said carbon electrode that forms an aqueous solution having a relatively low concentration adjacent said electrode that may be absorbed thereby; and an auxiliary cast comprising said electrolyte-forming material and talc located adjacent the upper portion of said electrode for increasing the initial concentration of said aqueous solution adjacent said electrode; the solution rate of said auxiliary body differing from the solution rate of the main body.

15. A water-activated deferred action cell comprising a carbon electrode pervious to water but not to electrolyte; a main cast of hydrated caustic soda around said carbon electrode; and an auxiliary cast above said main cast comprising caustic soda and lime.

16. A water-activated deferred action cell comprising a carbon electrode pervious to water but not to electrolyte of normal concentration; a main cast of hydrated caustic soda around said carbon electrode that forms an aqueous solution adjacent the upper portion of said electrode that may be absorbed thereby; and an auxiliary cast comprising caustic soda and from 2 per cent to 15 per cent lime located adjacent the solution level for increasing the initial concentration of the solution adjacent said electrode to such an extent that the solution will not penetrate the electrode.

17. In a water-activated air-depolarized deferred action cell having a carbon electrode pervious to water but impervious to the electrolyte employed therewith, and an electrolyte-forming material within the cell; the combination of means for isolating said electrode from the water of activation until a substantial part of said electrolyte-forming material has been dissolved, comprising a cast of part of said electrolyte-forming material that forms an aqueous solution having a specific gravity greater than that of water around said electrode; and means for increasing the concentration of the partially formed electrolyte in the upper layers during the period of formation, comprising a cast of part of said electrolyte-forming material and a solution retardant in the upper portion of said cell.

18. A water-activated deferred action cell having a main body consisting of hydrated caustic soda within said cell and an auxiliary body of hydrated caustic soda and lime disposed within said cell and above said main body.

19. In a water-activated air-depolarized deferred action cell, the combination of a main body of electrolyte ingredient that forms an aqueous solution of different concentration at different depths, with an auxiliary body of solid electrolyte ingredient located in the area of low concentration for increasing the relative concentration thereof; the solution rate of said auxiliary body being less than the solution rate of the main body.

GEORGE W. HEISE.
ERWIN A. SCHUMACHER.

CERTIFICATE OF CORRECTION.

Patent No. 2,077,562.            April 20, 1937.

GEORGE W. HEISE, ET AL.

It is hereby certified that in Certificate of Correction issued June 1, 1937 in the above numbered patent, line 5, "lines 2-3" should read lines 1-2; so that the said Certificate may conform to the record of the case in the Patent Office.

Signed and sealed this 6th day of July, A. D. 1937.

Henry Van Arsdale (Seal)                      Acting Commissioner of Patents.

CERTIFICATE OF CORRECTION.

Patent No. 2,077,562.                                                April 20, 1937.

GEORGE W. HEISE, ET AL.

It is hereby certified that error appears in the printed specification of the above numbered patent requiring correction as follows: Page 3, second column, lines 2-3, claim 14, strike out the semi-colon and words "; the solution rate of said auxiliary body differing from the solution rate of the main body"; and that the said Letters Patent should be read with this correction therein that the same may conform to the record of the case in the Patent Office.

Signed and sealed this 1st day of June, A. D. 1937.

Henry Van Arsdale (Seal)                                        Acting Commissioner of Patents.

CERTIFICATE OF CORRECTION.

Patent No. 2,077,562.                                         April 20, 1937.

GEORGE W. HEISE, ET AL.

It is hereby certified that error appears in the printed specification of the above numbered patent requiring correction as follows: Page 3, second column, lines 2-3, claim 14, strike out the semi-colon and words "; the solution rate of said auxiliary body differing from the solution rate of the main body"; and that the said Letters Patent should be read with this correction therein that the same may conform to the record of the case in the Patent Office.

Signed and sealed this 1st day of June, A. D. 1937.

Henry Van Arsdale
(Seal)                                     Acting Commissioner of Patents.

CERTIFICATE OF CORRECTION.

Patent No. 2,077,562. April 20, 1937.

GEORGE W. HEISE, ET AL.

It is hereby certified that in Certificate of Correction issued June 1, 1937 in the above numbered patent, line 5, "lines 2-3" should read lines 1-2; so that the said Certificate may conform to the record of the case in the Patent Office.

Signed and sealed this 6th day of July, A. D. 1937.

Henry Van Arsdale (Seal) Acting Commissioner of Patents.